United States Patent [19]

Tague et al.

[11] Patent Number: 5,243,601

[45] Date of Patent: Sep. 7, 1993

[54] APPARATUS AND METHOD FOR DETECTING A RUNAWAY FIRMWARE CONTROL UNIT

[75] Inventors: Steven A. Tague, Tyngsboro; William E. Woods, Natick, both of Mass.

[73] Assignee: Bull HN Information Systems Inc., Billerica, Mass.

[21] Appl. No.: 593,411

[22] Filed: Oct. 5, 1990

[51] Int. Cl.$^5$ .................. G11C 29/00; G06F 11/10
[52] U.S. Cl. ........................... 371/16.1; 371/51.1
[58] Field of Search ................ 371/16.1, 16.5, 51.1

[56] References Cited

U.S. PATENT DOCUMENTS

| | | | |
|---|---|---|---|
| 3,815,103 | 6/1974 | Holtey et al. | 371/51.1 |
| 3,831,148 | 8/1974 | Greenwald et al. | 371/51.1 |
| 4,019,033 | 4/1977 | Parmet | 371/51.1 |
| 4,108,360 | 8/1978 | Beismann et al. | 371/16.5 |
| 4,641,305 | 2/1987 | Joyce et al. | 371/16.1 |

Primary Examiner—Robert W. Beausoliel, Jr.
Assistant Examiner—Dieu-Minh Le
Attorney, Agent, or Firm—Faith F. Driscoll; John S. Solakian

[57] ABSTRACT

A method and apparatus pertaining to a firmware control unit for detecting when such control unit is not behaving properly. The control unit is organized to include in each location of the unit's control store, to which control is not expected to transfer, a predetermined type of pattern containing an address specifying the address of that location, a suitable tag identifying the probable reason for the unexplained jump, and a transfer of control to the appropriate entry point in a reporting firmware routine within the control store. The reporting firmware routine has a number of entry points for collecting all the executions of unexpected locations and for storing the appropriate address and tag information in a predetermined register file for later referencing by an unusual event (UEV) handler routine.

24 Claims, 5 Drawing Sheets

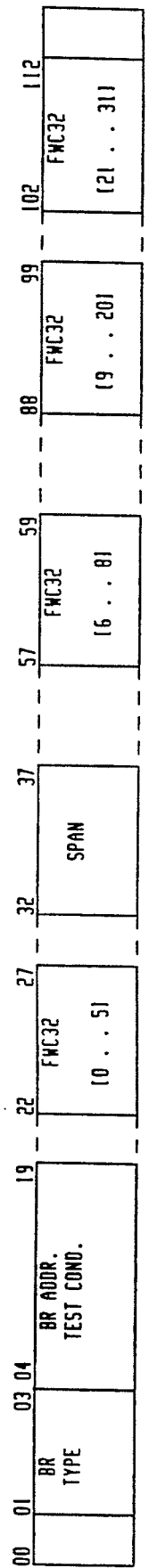

APPARATUS AND METHOD FOR DETECTING A RUNAWAY FIRMWARE CONTROL UNIT

RELATED PATENT APPLICATIONS AND PATENTS

1. The patent application of George J. Barlow, James W. Keeley, Richard A. Lemay, Jian-Kuo Shen, Robert V. Ledoux, Thomas F. Joyce, Richard P. Kelly and Robert C. Miller entitled, "Recovery Method and Apparatus for a Pipelined Processing Unit of a Multiprocessor System," filed on Oct. 5, 1990, bearing Ser. No. 07/593,458, which is assigned to the same assignee as this patent application.
2. The patent application of Ming-Tzer Miu and Thomas F. Joyce entitled, "Production Line Method and Apparatus for High Performance Instruction Execution," filed on Dec. 19, 1988, bearing Ser. No. 07/286,580, now abandoned, which is assigned to the same assignee as this patent application.
3. The patent application of David E. Cushing, Romeo Kharileh, Jian-Kuo Shen and Ming-Tzer Miu entitled, "Dual Port Read/Write Register File Memory," filed on Dec. 19, 1988, bearing Ser. No. 07/286,552, issued as U.S. Pat. No. 4,933,909 on Jun. 12, 1990, which is assigned to the same assignee as this patent application.
4. The patent application of Jian-Kuo Shen, Richard P. Kelly, Robert V. Ledoux and Deborah K. Staplin entitled, "Control Store Addressing from Multiple Sources," filed on Dec. 19, 1988, bearing Ser. No. 07/286,578, which is assigned to the same assignee as this patent application.
5. The patent application of Richard P. Kelly and Robert V Ledoux entitled, "Control Store Address Generator for Developing Unique Instruction Execution Starting Address," filed on Dec. 19, 1988, bearing Ser. No. 07/286,582, now abandoned, which is assigned to the same assignee as this application.
6. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," filed on Dec. 19, 1988, bearing Ser. No. 07/286,551, issued as U.S. Pat. No. 4,980,819 on Dec. 25, 1990 which is assigned to the same assignee as this application.

BACKGROUND OF THE INVENTION

1. Field of Use

The present invention relates to data processing and more particularly to microprogrammed control elements used to direct the operations of a processing unit.

2. Prior Art

As data processing systems become entrusted with performing increasingly more critical tasks requiring high dependability, this increases the need for such systems to be fault tolerant. An important aspect of a fault tolerant strategy is the detection of faults.

Faults are generally classified in terms of their duration, nature, and extent. The duration of a fault can be transient, intermittent, or permanent. A transient fault, often the result of external disturbances, exists for a finite length of time and is nonrecurring. A system with intermittent faults oscillates between faulty and fault-free operation, which usually results from marginal or unstable (metastable) device operation. The ability to detect faults reliably is essential to the recovery from transient faults.

Advances in computer architectures make it very difficult to implement recovery strategies for various types of faults without adding to design complexity. A key element in any processing unit is the control unit. Therefore, it becomes important to be able to detect when the control unit is not operating properly. Many processing units rely on microprogrammed or firmware control units. It is known to include error detection circuits within such microprogrammed control units for detecting any parity errors in each of the microinstructions read out during a cycle of operation. However, such arrangements are unable to detect the occurrence of transient or intermittent faults, particularly in the logic circuits which operate in conjunction with the microprogrammed control unit.

In at least one prior art system, a predetermined pattern was included in unused locations which caused a branch to a routine for reporting having accessed such a location. However, there was no way or means provided for determining how and where the fault occurred. Thus, the lack of information in this regard made it difficult to diagnose the cause of the fault.

Accordingly, it is a primary object of the present invention to provide a technique for detecting the occurrence of transient or intermittent faults within a microprogrammed control unit.

It is a more specific object of the present invention to provide a method and apparatus for use in conjunction with a microprogrammed control unit for facilitating the recovery of such control unit from transient or intermittent errors.

SUMMARY OF THE INVENTION

The above and other objects of the present invention are achieved by the incorporation of the present invention method and apparatus into a production or pipelined control processing subsystem (CSS) unit which is subject of the referenced related patent application of Ming-Tzer Miu and Thomas F. Joyce entitled, "Production Line Method and Apparatus for High Performance Instruction Execution." The CSS unit includes a plurality of VLSI chip circuits, some of which share common firmware control elements. As described in the related patent application, the CSS unit includes a central processing unit (CPU), a virtual memory unit (VMU), and a cache unit. The CPU includes an instruction unit stage (I-unit), an address unit stage (A-unit), and a number of parallel execution stages (E-unit, C-unit). The cache unit includes an instruction cache (I-cache) and a data cache (E-cache).

In accordance with the teachings of the present invention, the firmware control store which stores the microinstructions or firmware microprogram routines used by the control unit of an execution unit to execute instructions introduced into the pipeline is organized in a way so as to detect potential runaway events. These events are characterized as a type of unusual event (UEV) fault which enable recovery actions to be carried out as described in the referenced related copending patent application of George J. Barlow, et al. entitled, "Recovery Method and Apparatus for a Pipelined Processing Unit of a Multiprocessor System."

More specifically, all firmware locations of the control store not explicitly loaded with commands are loaded with a predetermined command pattern. That pattern specifies that, when the location is accessed, an address value identifying the location's address and a tag code specifying UNUSED is to be loaded into a predetermined working location of a register file included within the CPU. Additionally, the pattern specifies a jump to an entry point within a first collector routine of a reporting routine included within the control store. This routine joins a UEV handler routine which is described in the referenced related Barlow patent application.

Thus, when a transient or intermittent error causes the firmware control unit to execute a firmware location not normally expected to be accessed, such as an unused location, this is detected and signalled as an unusual event. This minimizes the occurrence of hard to detect subtle errors and enables control of the firmware control unit to be regained.

Also, in accordance with the teachings of the present invention, similar patterns are used explicitly to designate "impossible branch" destination firmware locations. This type of fault occurs when some of the branch ways of a four, eight or sixteen-way branch are impossible because of the logic of the value being tested (e.g. only three conditions of a four-way branch are valid) or by convention (e.g. a particular internal flag is defined for only 12 of 16 values). The difference between the pattern used in this situation and that used in unused locations is that the tag code identifies a bad branch and a second entry point within another collector routine included within the reporting routine.

The method of the present invention can be used to detect when a firmware location, which is reserved for future implementation of some function, is accessed. That is, a command pattern is stored in the reserved location which causes the registration of the location's address and a tag code designated STUB. Again, the command pattern causes a jump to the same collector routine used to process UNUSED locations.

In addition to the above, the method and apparatus of the present invention also is used to detect errors related to accessing of "trap" locations. A "trap" location is one that when reached or accessed during normal operation of an execution (E) unit firmware, cannot independently determine when to pass control to a subsequent firmware routine. The E-unit firmware must wait for that control transfer decision to be made by some other unit via a firmware interrupt mechanism which specifies when and where control should be transferred, independently of the transfer coded in the E-unit firmware. Traditionally, these cases were handled by coding a "trap" location to do nothing but jump to itself (i.e., as a loop-on-self location). It was intended and hoped that the firmware interrupt would break or interrupt the loop and transfer control out of the loop.

Should one of the "trap" locations be accidently entered as the result of a fault, or should the interrupt be overly delayed or not sent, the firmware control unit could wait in an endless loop. The present invention has changed all such loop-on-self locations to store a command pattern which causes the registration of the location's address along with a TRAPWAIT code tag. Additionally, the command pattern causes a jump to another entry point in a common routine which sets up a limited loop count waiting for receipt of the anticipated interrupt signal. If the loop count is exhausted before receipt of the interrupt signal, then a UEV event is signalled. In the case where the interrupt signal is received prior to the exhausting of the loop count, then the E-unit control unit sequences normally, and no UEV is signalled.

The organization of a firmware control store according to the present invention ensures a reliable recovery from transient or intermittent errors which would otherwise result in abnormal behavior within a CPU.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

BRIEF DESCRIPTION OF THE DRAWINGS

FIGS. 4a through 4c are used in describing the organization of the firmware control store according to the teachings of the present invention.

DETAILED DESCRIPTION OF THE PREFERRED EMBODIMENT

CSS Unit

Figure 1:
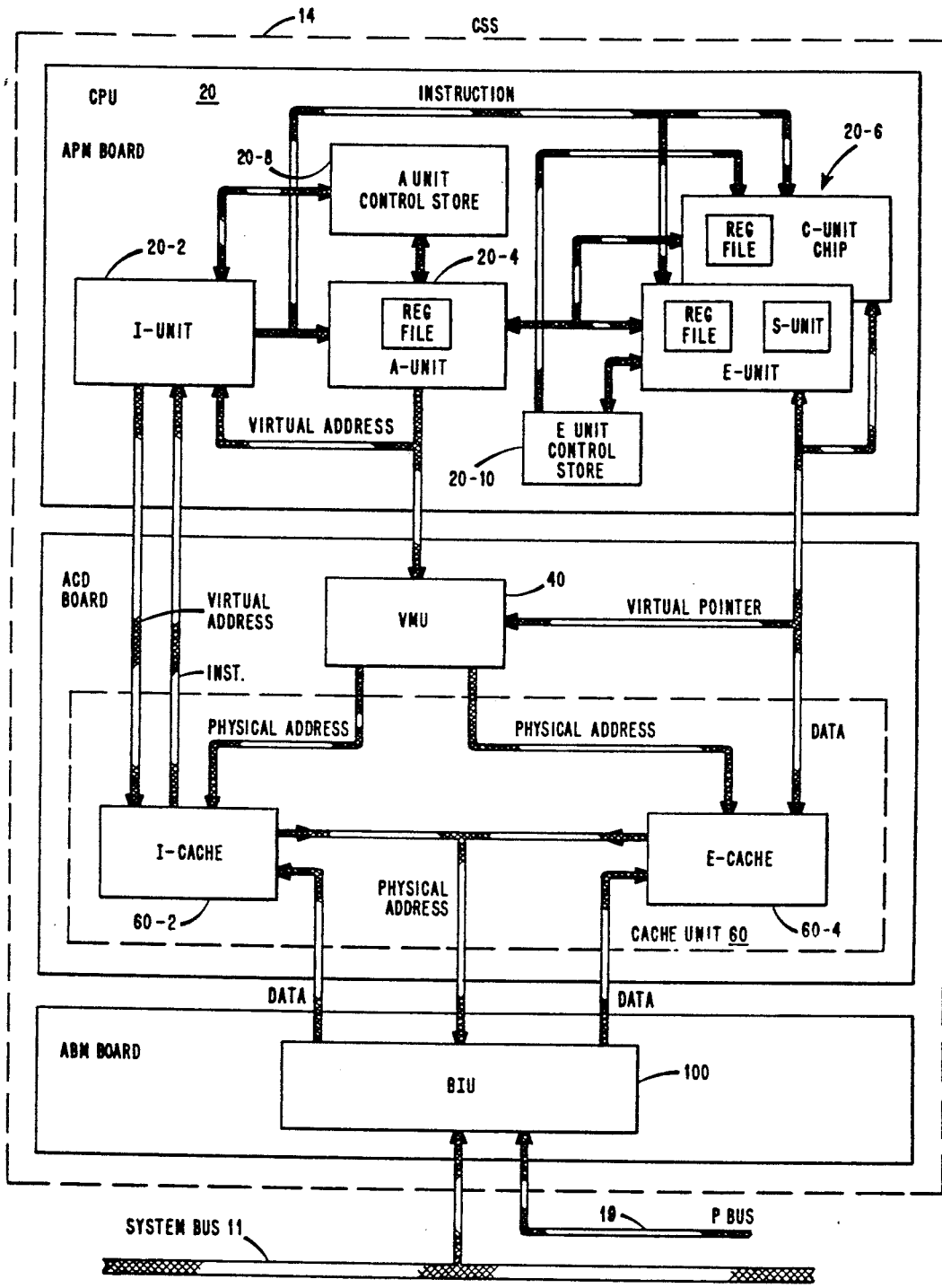
FIG. 1 is a block diagram of a central subsystem (CSS) unit which incorporates the method and apparatus of the present invention.

FIG. 1 shows, in block diagram form, the central subsystem (CSS) unit 14 which takes the form of the production data processing system of the related patent application of Ming-Tzer Miu and Thomas F. Joyce. As shown, CSS unit 14 includes a central processing unit (CPU) 20, a virtual memory unit (VMU) 40 and a cache unit 60. The cache unit 60 couples to system bus 11 through a bus interface unit (BIU) 100.

As shown, the main elements of CPU 20 include an instruction unit (I unit) stage 20-2, an address unit (A unit) stage 20-4 and an execution unit (E unit) stage 20-6. In the preferred embodiment, the execution unit stage 20-6 includes a scientific unit (S-unit) and a commercial instruction processing unit (C-unit). The cache unit stage 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from the I-cache unit 60-2 and cracks or decodes these instructions to determine how the other units, namely the A-unit 20-4 and the E-unit 20-6, will further process those instructions. The I-unit 20-2 also completes the execution of certain branch instructions, which are then removed from the production line.

The A-unit 20-4 generates addresses from instructions it receives from the I-unit 20-2. Additionally, it completes the execution of certain types of instructions, such as register-to register type instructions, removing them from the production line. When the instruction is a type of instruction which is to be executed by E-unit 20-6, the A-unit 20-4 sends a virtual address to VMU 40, which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 will also confirm the execution of a branch instruction and send the branch address back to the I-unit 20-2, which will have already requested the next instruction from the I-cache unit 60-2, as specified by the I-unit 20-2 prefetch branch address.

As seen from FIG. 1, both the A-unit 20-4 and E-unit 20-6 include register files which store the contents of the registers which are software programmer accessible. Also, both the I-cache unit 60-2 and E-cache unit 60-4 are updated with instructions and operands fetched from main memory via system bus 11 and BIU 100.

As shown in FIG. 1, the I-unit stage 20-2 and A-unit stage 20 4 share a common firmware control store element 20-8. Similarly, E-unit, S-unit, and C-unit execution units 20-6 share another common firmware control store element 20-10.

Figure 2:
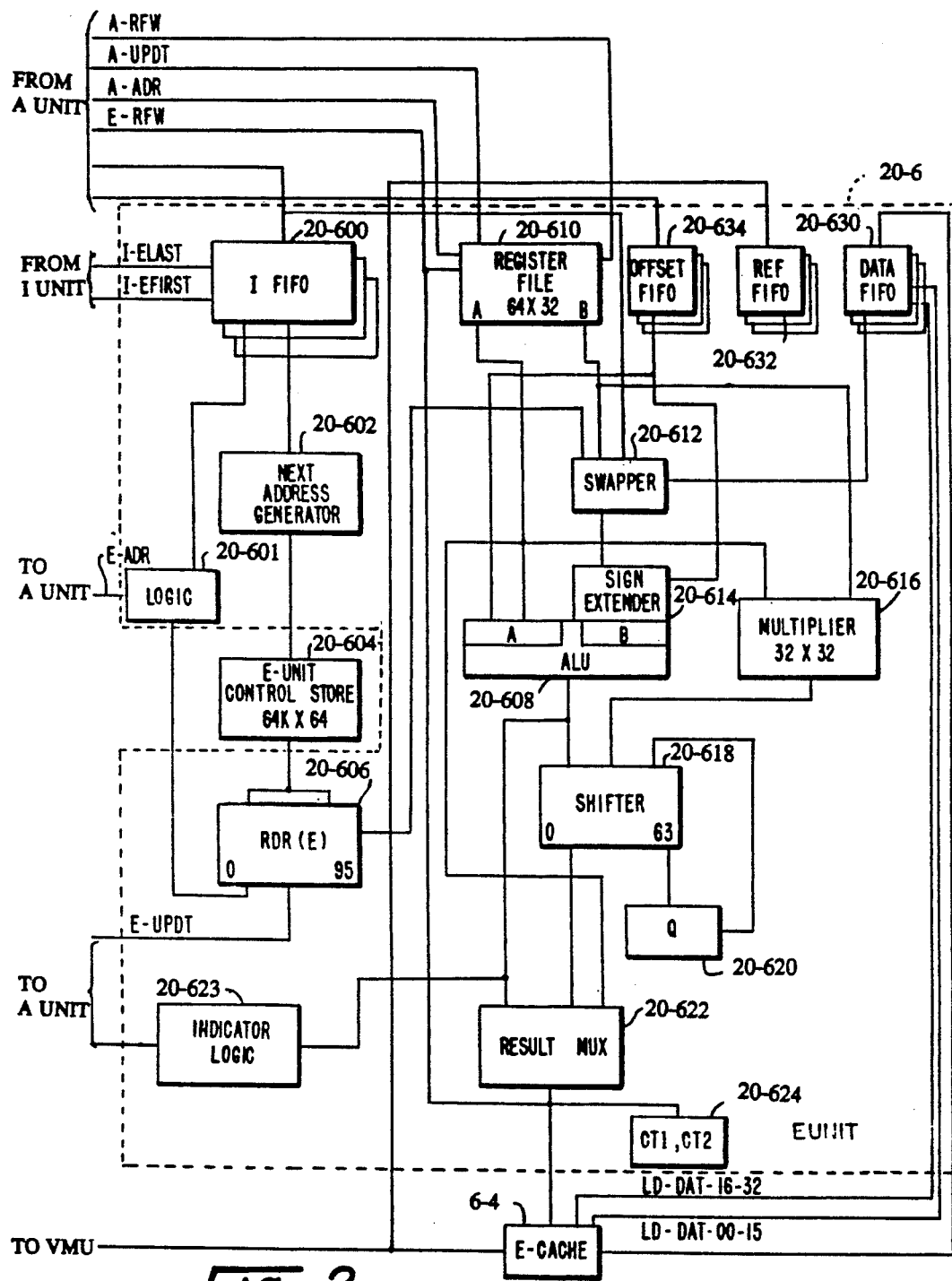
FIG. 2 shows in greater detail, the E-unit stage of FIG. 1.

E-Unit Stage 20-6 - FIG. 2

FIG. 2 shows in greater detail, E-unit stage 20-6. As shown, E-unit stage 20-6 includes an instruction FIFO buffer 20-600 for storing up to four instructions received from the I-unit stage 20-2. The I-unit 20-2 generates I-EFIRST and I-ELAST signals when the instruction being cracked is to be executed by E-unit 20-6. These signals are applied to FIFO buffer 20-600. Signal I-EFIRST enables the FIFO buffer 20-600 to store a double word instruction while signal I-ELAST enables buffer 20-600 to store a single word instruction.

The next instruction is applied by FIFO buffer 20-600 to a next address generator 20-602. Generator 20-602 generates an address applied to E-unit control store 20-604. This results in a firmware word being read out into an output register (RDR) 20-606.

When A-unit 20-4 sends a virtual address to VMU40, VMU 40 translates the virtual address into a physical address which is sent to E-cache unit 60-4. E-cache unit 60-4 forwards the contents of the addressed location to a data FIFO buffer 20-630, in response to E-cache signal LD-DAT-16-32 for a single word transfer and E-cache signal LD-DAT-00-15 for a double word transfer. Signal LD-DAT-00-15 also increments by one the write address stored in FIFO buffer 20-630 to accept the next word transfer. The E-unit 20-6 executes instructions whose operands are stored in software visible register locations of register file 20-610.

Figure 3:
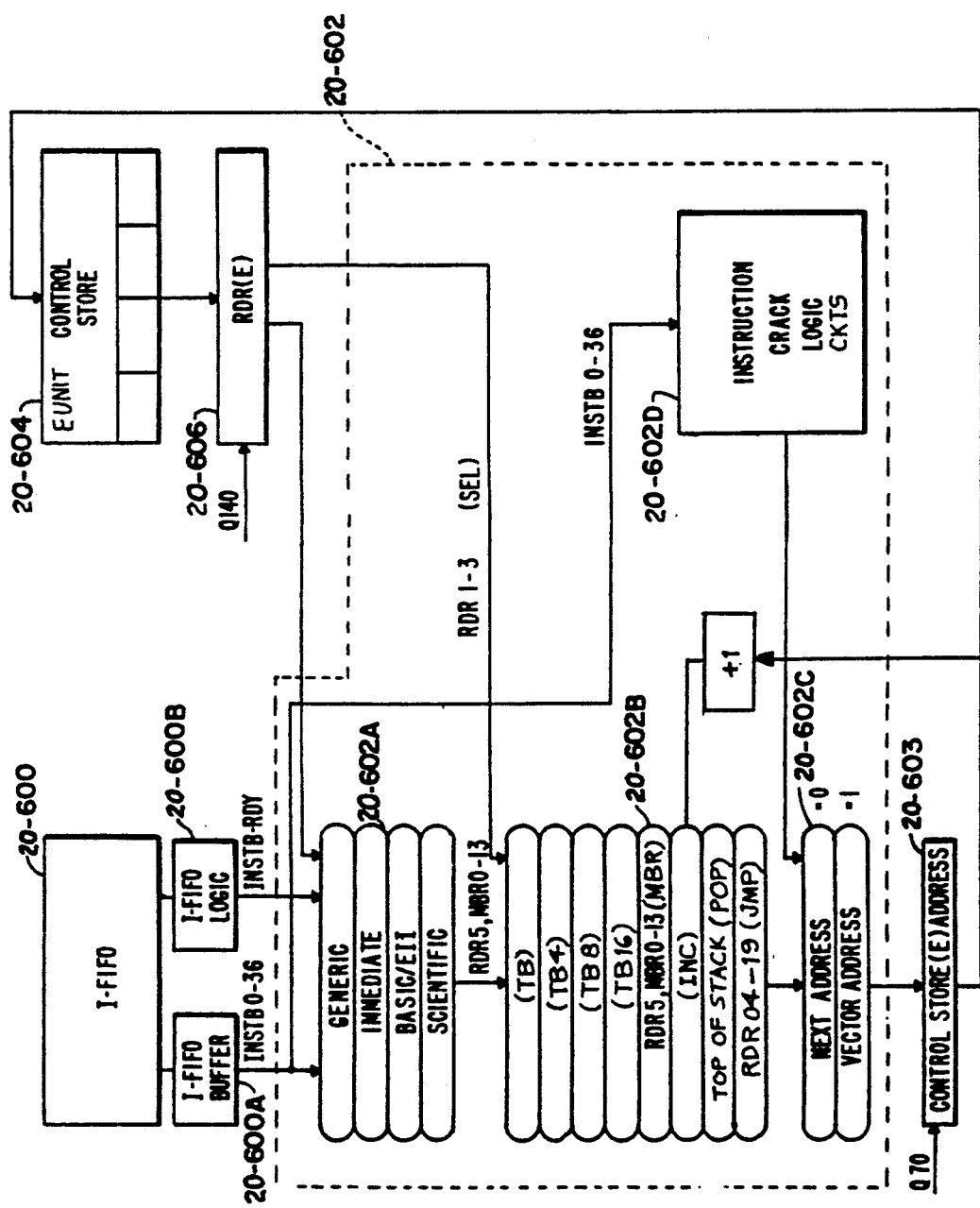
FIG. 3 shows in greater detail, certain portions of the E-unit stage of FIG. 2.

Next Address Generator - FIG. 3

FIG. 3 shows, in greater detail, the next address generator circuits of block 20-602. As shown, the generated address is stored in a control store address register 20-603 each clock cycle. The content of register 20-603 addresses control store 20-604 to read out a firmware word and store it in RDR register 20-606. The firmware word controls the E-unit stage 20-6.

The next address generator 20-602 can determine the next control store address by cracking the next high level instruction in the I-FIFO 20-600 (MBR) or by combining a base address in RDR 20-606 with one to four status bits selected by other fields in RDR20-606 (TB, TB4, TB8, TB16), or by copying a next-address field of RDR20-606 (JMP), or by incrementing the current control store address 20-603 (INC), or by selecting the top of a firmware subroutine return stack (POP), or by being forced (independently of the coding in RDR20-606) to a vector address by some external event (VINT, SMFINT, UEV, etc.). The next address generator 20-602 performs similar services for C-unit firmware (CTB, CTB4, CTB8, CTB16, CJMP, CINC, CPOP, etc.).

For further information regarding the next address generator and the E-unit stage, reference may be made to the referenced related patent application entitled, "Control Store Address Generator for Developing Unique Instruction Execution Starting Address."

Control Store Firmware Word - FIG. 4a

FIG. 4a shows the format of the firmware word of the 64K by 115-bit E/C-unit control store 20-604. As mentioned, this control store is shared between the C-unit chip and E-unit chip. The unit using the control store is defined by RDR bits 28 and 29.

Only the fields of the firmware word of interest to the present invention will be described. Bits 01-03 are a three-bit field which defines the branch type used for deriving the next control store address in a given microprogram sequence.

Bits 4-19 are a 16-bit field which define the test and major branch conditions or the next firmware address to be executed. Bits 22-27, 57-59, 88-99, and 102-112 are concatenated to form a 32-bit literal constant (FWC32) which can be deposited, by codes in other fields, not shown, into the A-unit register file location specified by the SPAV field bits 32-37.

DESCRIPTION OF OPERATION

With reference to FIGS. 1 through 4a, the method and apparatus of the present invention will now be described with reference to FIG. 4b. In accordance with the present invention, each vacant, unused, potentially illegal branched to, reserved, and wait for trap location contained in control store 20-604 is coded to contain a different unique command pattern. Additionally, control store 20-604 is programmed to store a firmware reporting routine which joins a UEV handler routine described in the referenced related George J. Barlow patent application. The firmware reporting routine as shown includes a number of collector processing routines designated as $VAG, $IMF, $PURG, and $DAMT. The coding of these routines is set forth in the Appendix.

As mentioned, all firmware locations of the control store 20-604 not explicitly loaded with command words, such as those formatted as shown in FIG. 4a, are loaded with predetermined command patterns. One pattern is used to identify unused locations. This pattern contains an address value identifying the location's address and a first tag code which specifies the location as "UNUSED." Appropriate bits within the pattern are coded to specify a branch or jump to an entry point within the firmware reporting routine. This corresponds to the starting location of the $VAG collector routine.

During control store 20-604 operation, if the next address generator circuits 20-602 are caused, by a transient or intermittent error, to access for execution an unused firmware location, the command bit pattern is read out into RDR register 20-606. The coded fields contained in RDR register 20-606 cause the VAG routine to be entered. This routine causes the address of that unused location of the E-unit control store being accessed to be written into working location 7 (WL7) of the A-unit 20-4 register file. This results in the storage of information, such as that shown in FIG. 4b.

Also, in accordance with the present invention, a similar type of command pattern is used to designate impossible branch destination firmware locations. This pattern is used to detect a type of fault occurring when a transient or intermittent condition produces some of the branch ways of a four, eight or sixteen-way branch which are impossible because of the logic of the value being tested (e.g. only three conditions of a four-way branch are valid) or by convention (e.g. a particular internal flag is defined for only 12 of 16 values). For example, a four-way branch may be defined by the most significant bit (MSB) and =0 of a value which should yield the cases <0, =0 and >0. When the fourth way (=0 and MSB=1) occurs, this indicates a hardware failure or a UEV condition. A two's complement number can only be <0, =0, or 0. Therefore, a four-way branch on a number's sign and on the number being =$\phi$, logically cannot transfer to the case corresponding to both =$\phi$ and the sign bit value which implies the number is <$\phi$.

Figure 4C:
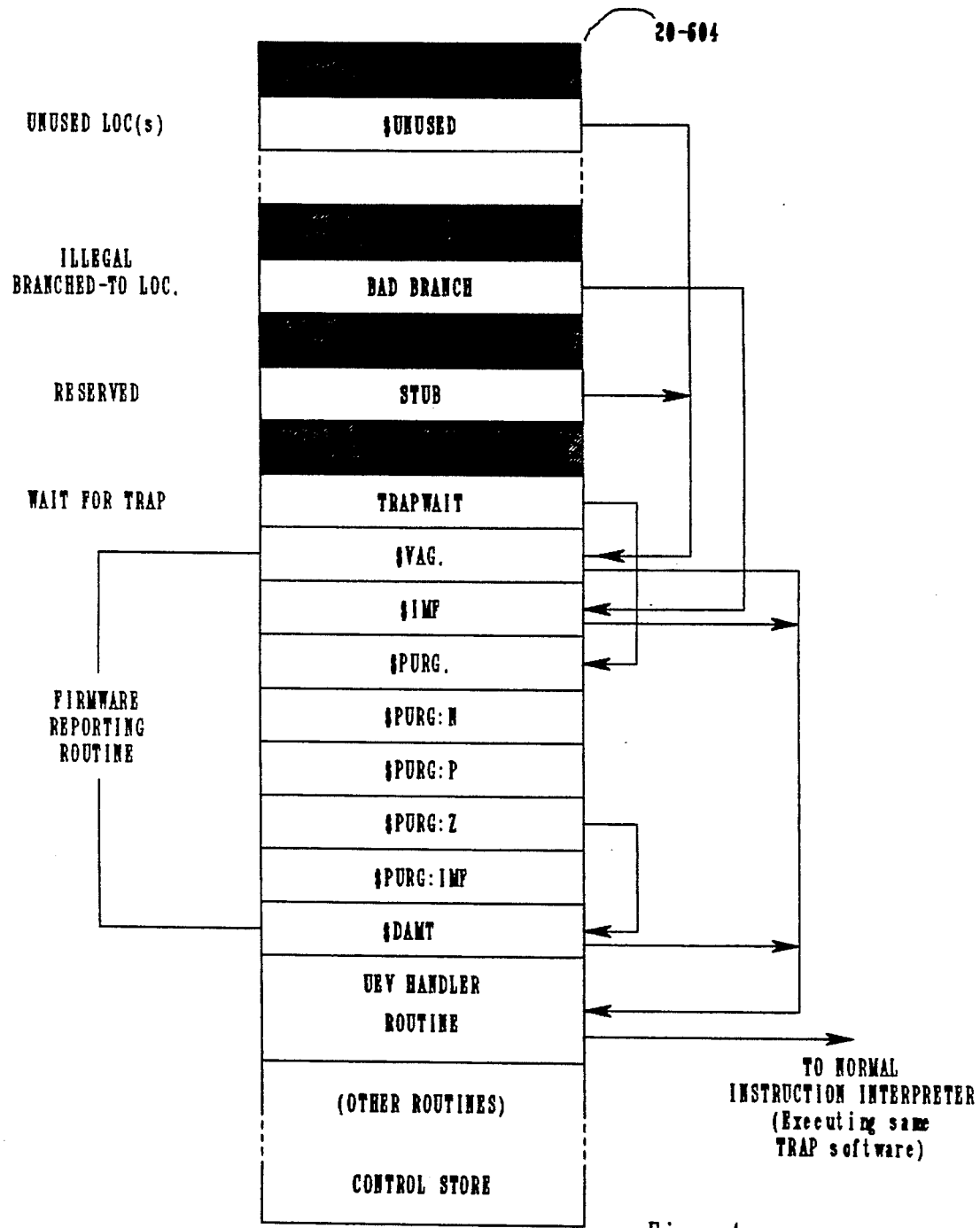

During the operation of control store 20-604, if the input conditions to the next address logic circuits produce an invalid branch, the resultant access is to one of the illegal branched to locations such as shown in FIG. 4c. When this location is accessed, the control store 20-604 is caused to reference a second collector routine $IMF. This causes a second tag code "8002" designating BADBRANCH along with the E-unit firmware address of the control store location $BADBRANCH of FIG. 4c.

In certain cases, a firmware designer can put a branch in place to reserve a destination firmware location for a possible future implementation. In accordance with the present invention, each such reserved location is coded to store a command pattern which specifies loading A-unit location WL7 with a further tag code "8009" and the address of the reserved location. During control store operation, when a reserved location is referenced, such as that of Figure 4c, the command pattern is read out into RDR register 20-606. The decoding of the command causes the control store to branch to the $VAG collector routine. This result causes the tag code "8009" and the address of the reserved location in FIG. 4c to be loaded into register file location WL7. The result is as shown in FIG. 4b.

In addition to the above, the method and apparatus of the present invention can be extended to detect a failure to receive a trap. The E-unit firmware control unit, in the case of I-unit detected traps, must wait for the VMU40 to send interrupt signal VINT to send the E-unit control store 20-604 to the appropriate handler. If one of the "wait for trap" locations is accidently entered as the result of a transient or intermittent condition, or if the I-chip stage 20-2 fails to consummate the interrupt request, the wait-for trap loop could loop forever. To prevent this, a coded command pattern replaces in all loop-on-self locations. This command pattern specifies the loading of A-unit WL7 register file location with a TRAPWAIT code of "8003" and the address of the wait for trap location. Additionally, the command pattern specifies that the E-unit control store 20-604 is to jump to the routine $PURG which sets up a limited loop (i.e., count of 64 K clock cycles) waiting for receipt of the VINT interrupt signal.

Accordingly, during E-unit operation, when a wait for trap location is accessed accidentally, this causes the read out of the command pattern into RDR register 20-606. The command pattern, upon being read out, causes A-unit WL7 location to be loaded with the wait-for-trap location address along with the TRAPWAIT tag code of "8003." This produces the result shown in FIG. 4b. Also, the E-unit control store 20-604 is caused to jump to routine $PURG which sets a second A-unit working location AWI to all ONES. This location is used for the count down; its contents are decremented by one for each cycle of the E-unit loop. Next, the E control store references routines $PURG:N, $PURG:P, PURG:Z, and $DAMT as a function of the time the E-unit stage is required to wait for interrupt signal VINT from VMU40. If the loop count is decremented to all ZEROS again before signal VINT is received, the routine $PURG:Z is entered which causes a jump to routine $DAMT. The routine $DAMT causes the referencing of the UEV firmware handler for signalling the detection of a UEV fault. When the interrupt signal VINT is received prior to the loop count reaching ZEROS, the count down is aborted. This frees up A-unit WL7 location to be overwritten for any firmware purpose.

From the above, it is seen how the method apparatus of the present invention enables the identification of probable reasons for faults occurring within the E-unit firmware control unit indicative of a runaway condition. This can be achieved with no changes to the E-unit firmware control unit.

For further information regarding the manner in which the codes are allocated and stored in the control store, reference may be made to the Appendix.

APPENDIX

The following is a pseudo-code representation of the relevant part of the firmware statements in terms of a higher-level syntax used for specifying the desired actions performed by the present invention.

$UNUSED
this label name causes the assembler/-linker
to act as if these actions were explicitly coded for every otherwise unallocated firmware address AW7<—8001#:0:$SELF
$SELF is the 15-bit address of
the location being assembled. "nnnn#" represents a 16-bit hexadecimal literal. The ":" concatenates the values on either side.

JMP($VAG)
;
$BADBRANCH (1234#)
The label and allocated
address, 1234₁₆, are purely for illustration of how a "BAD BRANCH" type location should be coded.

AW7<—8002#:0:$SELF
JMP($IMF)
;
$STUB (4567#)
The label and allocated address,
4567₁₆, are purely for illustration of how a "STUB" type location should be coded.

```
    AW7 <— 8009#:0:$SELF
    JMP($VAG)
;
$TRAPWAIT (89AB#)
The label and allocated
                            address, 89AB_{16}, are purely
                            for illustration of how a
                            "WAIT-FOR-TRAP" type location
                            should be coded.

AW7 <— 8003#:0:$SELF
    JMP($PURG)
;
$VAG (7FED#)
This is one of the
runaway firmware
                    reporting routines
    WL7 <— AW7
    JMP($FW-UEV)
;
$IMF (7FEF#)
This is one of the runaway
firmware
                    reporting routines
    WL7 <— AW7
    JMP($FW-UEV)
;
$PURG (7FED#)
This is one of the runaway
firmware
                    reporting routines
    AW1 <— 65535
    Loop count. This sets
    ALU-SIGN and
                    clears ALU-ZERO flags
    JMP($PURG:N)
;
$PURG:N (7FE2#)
    AW1 <— AW1 - 1
    Some external event
    should
                            break the firmware out of this
                            loop before 65535 decrements of
                            AW1 have occurred. This also
                            updates the ALU-SIGN and
                            ALU-ZERO flags.

IF ALU-ZERO and NOT ALU-SIGN JMP($PURG:Z)
                                    i.e., previous
                                    step put zero
                                    into AW1.
    IF ALU-ZERO and ALU-SIGN JMP ($PURG:IMF)
    i.e.,
                                        the impossible
                                        occurred in
                                        the previous
                                        step.
    IF NOT ALU-ZERO and NOT ALU-SIGN JMP
                                    ($PURG:P)
                                    i.e.,
                                    previous step
                                    made AW1>0
    IF NOT ALU-ZERO and ALU-SIGN JMP ($PURG:N)
                                    i.e., the
                                    previous
                                    step made
                                    AW1<0
;
$PURG:P (7FC2#)
    AW1 <— AW1 -1
    Some external event
    should
                            break the firmware out of this
                            loop before 65535 decrements of
                            AW1 have occurred. This also
                            updates the ALU-SIGN and
                            ALU-ZERO flags.

IF ALU-ZERO and NOT ALU-SIGN JMP ($PURG:Z)
                                    i.e., previous
                                    step put zero
                                    into AW1.
    IF ALU-ZERO and ALU-SIGN JMP ($PURG:IMF)
    i.e.,
                                        the impossible
                                        occurred in
                                        the previous
                                        step
    IF NOT ALU-ZERO and NOT ALU-SIGN JMP
                                    ($PURG:P)
                                    i.e.,
                                    previous step
                                    made AW1>0
    IF NOT ALU-ZERO and ALU-SIGN JMP ($PURG:N)
                                    i.e., the
                                    previous step
                                    made AW1<0
;
$PURG:Z (7FD2#)
    JMP ($DAMT)
    The firmware must
    have a problem to
    reach here
;
$PURG:IMF (7FF2#)
A real example of an
IMPOSSIBLE
                            BRANCH!
    AW7 <— 8002#:0:$SELF
    JMP ($IMF)
;
$DAMT (7FEC#)
    WL7 <— AW7
    JMP ($FW-UEV)
;
```

It will be appreciated, however, that the present invention is not limited or restricted to any particular assembling technique or apparatus. Many changes may be made to the preferred embodiment, such as specifying different codes, etc.

While in accordance with the provisions and statutes there has been illustrated and described the best form of the invention, certain changes may be made without departing from the spirit of the invention as set forth in the appended claims and, in some cases, certain features of the invention may be used to advantage without a corresponding use of other features.

What is claimed is:

1. A method for detecting when a microprogrammed control element of a processing unit is not behaving properly, said element including a control store having a plurality of storage locations, different groups of said locations allocated for storing microprogram microinstructions for controlling the operation of said processing unit, next address generation circuits connected to said control store for defining the address of the next microinstruction to be read out from said store for controlling said operation and a register file memory having a number of working locations for storing information during processing operations, said method comprising the steps of:

(a) storing in each unallocated location to which control is not expected to be transferred, a predetermined one of a number of control patterns used for identifying a corresponding number of reasons for unexplained behavior, each control pattern including a number of fields, a first field being coded to designate the type of behavior, a second field coded for identifying the address of the unallocated of the location and a third field coded to specify a predetermined transfer of control operation;

(b) storing in another group of locations, a plurality of microinstructions of a number of reporting routines for referencing by said unallocated locations as a function of said third fields;

(c) causing said next address generating circuits to effect transfer of control operation to a specified one of said number of reporting routines as a function of said third field coding in response to accessing each unallocated location; and, (d) storing signals representative of said first and second fields reason and address identification codes respectively in a predetermined one of said plurality of working locations of said register file memory as a result of step (c) for indicating when said processing unit is not behaving properly.

2. The method of claim 1 wherein said first field of a first one of said number of control patterns is coded to specify when said transfer of control operation in step (c) resulted from said control store having attempted to execute the contents of an unused location.

3. The method of claim 2 wherein said first field of said first one of said number of control patterns is coded to include an UNUSED tag code.

4. The method of claim 1 wherein said first field of a second one of said number of control patterns is coded to specify when said transfer of control in step (c) resulted from said control store having attempted to execute an impossible branch operation for indicating when said processing unit is not behaving properly.

5. The method of claim 4 wherein said first field of said second one of said number of control patterns is coded to include a BAD BRANCH tag code.

6. The method of claim 5 wherein said BAD BRANCH tag code signals that said next address generation circuits branched on an illegal condition relative to the logic of the value being tested by said circuits.

7. The method of claim 1 wherein said first field of a third one of said number of control patterns is coded to specify when said transfer of control in step (c) resulted from said control store having attempted to execute the contents of a reserved location which resulting in reporting that said processing unit is not behaving properly.

8. The method of claim 7 wherein said first field of said third one of said number of control patterns is coded to include a STUB tag code.

9. The method of claim 1 wherein said first field of a fourth one of said number of control patterns is coded to specify when said transfer of control in step (c) resulted from said control store having continued executing a wait on trap loop for longer than a predetermined period of time which resulted in reporting that said processing unit is not behaving properly.

10. The method of claim 9 wherein said first field of said fourth one of said number of control patterns is coded to include a TRAPWAIT tag code.

11. The method of claim 10 wherein step (c) further includes the steps of:

(e) establishing a loop count predetermined one of said working locations of said register file memory specifying said predetermined period of time;

(f) decrementing by one said loop count after each cycle through said loop executed by said processing unit; and, (g) upon said count being decremented to zero, causing said transfer of control in step (c) for reporting a failure of said next address generating circuits to receive an anticipated external event signal from another unit for causing said address generating circuits to break said processing unit out of said loop.

12. The method of claim 11 wherein said step (g) further includes the step of causing a transfer of control to another non returning routine by said address generating circuits when said external event signal is received from said another unit prior to said loop count being decremented to zero.

13. A system for detecting when a processing unit is not behaving properly, said system comprising:

a register file memory having a number of working locations for storing information during processing operations executed by said processing unit;

a control store coupled to said register file memory, said store having a plurality of storage locations, said different groups of a number of said locations storing microprogram microinstructions for controlling the operation of said processing unit, each unallocated location of said plurality of locations to which control is not expected to be transferred storing a predetermined one of a number of control patterns used for identifying a corresponding number of reasons useful in determining what caused unexplained behavior, each control pattern including a number of fields, a first field being coded to designate the type of behavior, a second field coded for identifying the address of the unallocated of the location and a third field coded to specify a predetermined transfer of control operation; and, another group of locations storing instructions of a reporting routine for reporting when said processing unit is detected as not behaving properly; and, next address generating circuits connected to said control store for defining the address of the next microinstruction to be red out from said control store and for transferring control to a specified entry point in said reporting routine as a function of said third field coding in response to accessing one of said unallocated locations; and said instructions of said reporting routine causing said control store to generate signals for storing signals representative of said first and second fields reason and address identifying codes respectively in a predetermined one of said plurality of working locations of said register file memory for indicating when said processing unit is not behaving properly.

14. The system of claim 13 wherein said first field of a first one of said number of control patterns is coded to specify when said predetermined transfer of control operation resulted from said control store having attempted to execute the contents of an unused location.

15. The system of claim 14 wherein said firs field of said first one of said number of control patterns is coded to include an UNUSED tag code.

16. The system of claim 13 wherein said control store includes branch circuits for performing a branch operation and wherein said first field of a second one of said number of control patterns is coded to specify when said transfer of control operation resulted from said control store branch circuits having attempted to execute an impossible branch operation for indicating when said processing unit is not behaving properly.

17. The system of claim 16 wherein said first field of said second one of said number of control patterns is coded to include a BAD BRANCH tag code.

18. The system of claim 17 wherein said BAD BRANCH tag code signals that an said next address generation circuits branched on an illegal condition relative to the logic of the value being tested by said circuits.

19. The system of claim 13 wherein said first field of a third one of said number of control patterns is coded to specify when said transfer of control operation resulted from said control store having attempted to execute the contents of a reserved location which resulting in reporting that said processing unit is not behaving properly.

20. The system of claim 19 wherein said first field of said third one of said number of control patterns is coded to include a STUB tag code.

21. The system of claim 13 wherein said first field of a fourth one of said number of control patterns is coded to specify when said transfer of control operation resulted from said control store having continued executing a wait on trap loop for longer than a predetermined period of time which resulted in reporting that said processing unit is not behaving properly.

22. The system of claim 21 wherein said first field of said fourth one of said number of control patterns is coded to include a TRAPWAIT tag code.

23. The system of claim 22 wherein said next address generating circuits includes means for receiving an anticipated external event signal and wherein routine further causes the generation of signals for storing a loop count in another predetermined one of said working locations of said register file memory specifying said predetermined period of time, decrementing by one said loop count after each cycle through said loop executed by said processing unit and upon said count being decremented to zero, causing said transfer of control to said reporting routine for reporting that said next address generating circuits did not receive said anticipated external event signal from another unit for causing said next address generating circuits to break said processing unit out of said loop.

24. The system of claim 23 wherein said reporting routine further generates signals for causing a transfer of control to another non returning routine by said next address generating circuits when said external event signal is received from said another unit prior to said loop count being decremented to zero.

* * * * *